US006628776B1

United States Patent
Lee

(10) Patent No.: US 6,628,776 B1
(45) Date of Patent: Sep. 30, 2003

(54) DNIC PERIPHERAL EXTENDER

(75) Inventor: Gordon Lee, Kanata (CA)

(73) Assignee: Mitel Networks Corporation (CA)

( * ) Notice: Subject to any disclaimer, the term of this patent is extended or adjusted under 35 U.S.C. 154(b) by 0 days.

(21) Appl. No.: 09/570,116

(22) Filed: May 12, 2000

(30) Foreign Application Priority Data

May 13, 1999 (GB) .............................................. 9910976

(51) Int. Cl.[7] .............................................. H04M 7/00
(52) U.S. Cl. ...................................... 379/225; 379/230
(58) Field of Search .............................. 370/522, 524; 379/219, 220.01, 225, 229, 230

(56) References Cited

U.S. PATENT DOCUMENTS 5,612,990 A * 3/1997 Meier et al. ............... 455/466
5,911,123 A * 6/1999 Shaffer et al. ............. 455/554

FOREIGN PATENT DOCUMENTS

| EP | 0857004 | 8/1998 |
| EP | 0909079 | 4/1999 |
| WO | 9718662 | 5/1997 |

* cited by examiner

Primary Examiner—Ahmad F. Matar
Assistant Examiner—Quynh H. Nguyen
(74) Attorney, Agent, or Firm—Jones Day

(57) ABSTRACT

A system for extending remote digital telephone set functionality over a public switched telephone network from a local PBX, comprising a local peripheral connected to the PBX for bidirectionally communicating combined digital voice and data signals with the PBX, and a remote peripheral connected to the remote digital telephone set. Each of the local and remote peripherals include circuitry for separating and recombining the combined digital voice and data signals into respective voice and data components for bidirectional communication between the peripherals over individual voice and data channels, such that the remote digital telephone set functions as if it were connected directly to the PBX.

5 Claims, 4 Drawing Sheets

DNIC PERIPHERAL EXTENDER

FIELD OF THE INVENTION

This invention relates in general to digital telephony, and more particularly to a method and apparatus for extending digital telephone set functionality at a remote office under remote control of a central PBX (Private Branch Exchange).

BACKGROUND OF THE INVENTION

The ability to extend digital telephone set capabilities to remote offices at a reasonable cost, has been recognized as being highly desirable in the telecommunications industry. Normally, in order to provide such capabilities, a PBX networking solution is required which involves the purchasing of multiple expensive PBXs.

SUMMARY OF THE INVENTION

According to the present invention, a method and apparatus is provided for extending digital set functionality to a remote peripheral under local control of a centralized PBX, using analog or digital trunks, thereby obviating the need to purchase additional PBXs for the remote office.

BRIEF DESCRIPTION OF THE DRAWINGS

A detailed description of the preferred embodiment of the present invention is provided herein below, with reference to the drawings in which.

DETAILED DESCRIPTION OF THE PREFERRED EMBODIMENT

Figure 1:
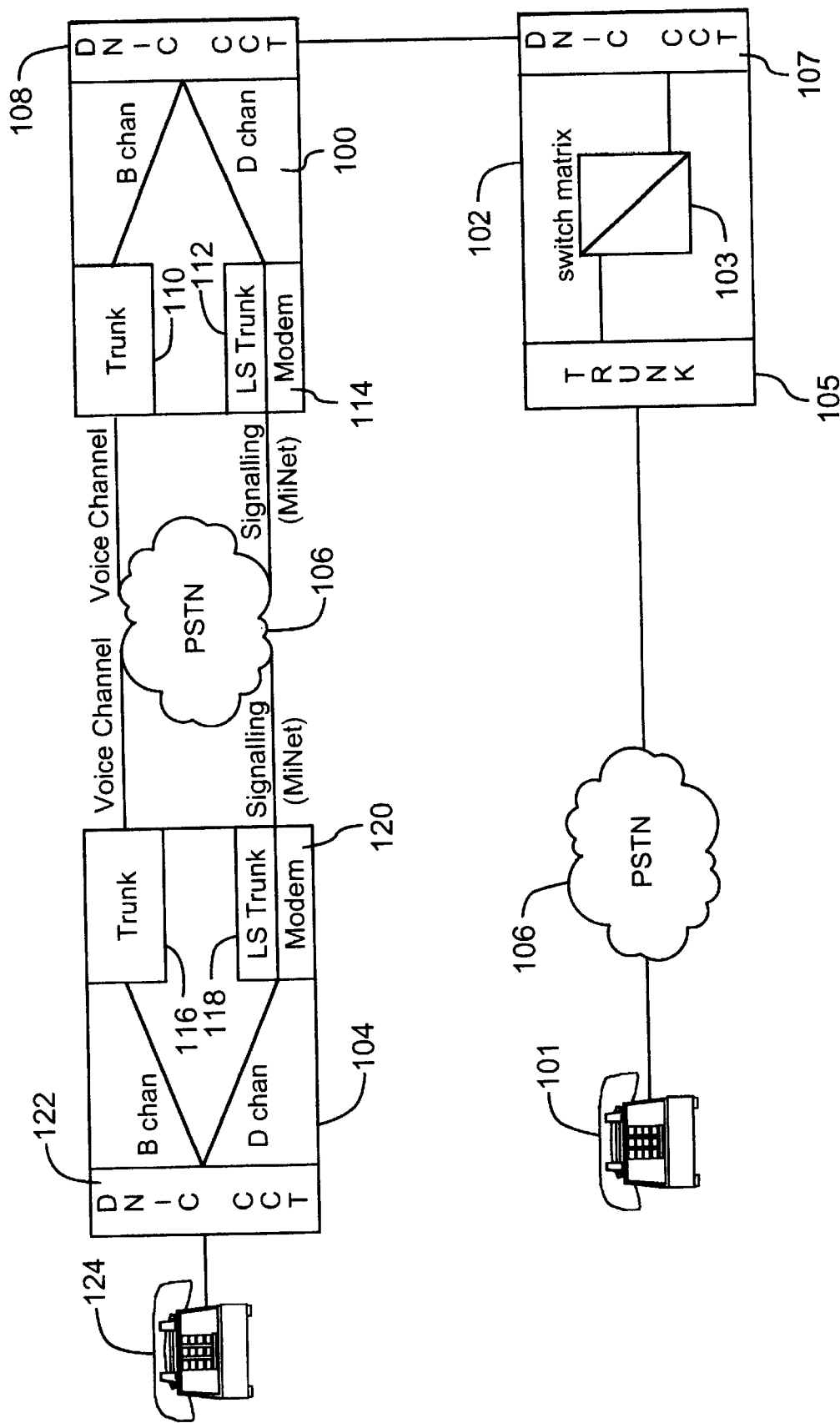
FIG. 1 is a block diagram of a telecommunications system for extending digital set functionality to a remote location, in accordance with the principles of the present invention.

With reference to FIG. 1, a communication system is shown for exchanging voice and data in accordance with the well known DNIC digital telephony standard (Digital Network Interface Circuit). A local peripheral 100 is connected to a PBX 102, and a remote peripheral 104 is connected to the local peripheral 100 via the PSTN 106. A call originating with or terminating on telephone set 101 may be routed through switch matrix 103 of PBX 102 for communication with local peripheral 100, in a well known manner. The PBX 102 is provided with a plurality of trunk circuits 105 on which Central Office (CO) lines are terminated, and a DNIC circuit 107 is provided for communication with a DNIC circuit 108 in the local peripheral 100 over a serial link (e.g. Mitel® ST-BUS).

DNIC B (voice) and D (signaling) channel data are separated in local peripheral 100 via DNIC circuit 108 for transmission over trunks 110 and 112, respectively. Thus, the local peripheral 100 presents a DNIC set interface to the PBX 102. The B channels are circuit switched to trunk interface circuit 110. The D channel (e.g. Minet®) messages are extracted from the DNIC link layer and converted to modem tones via modem 114 prior to transmission over dedicated LS (Loop Start) trunk 112.

The remote peripheral 104 receives the B and D channel data from the PSTN 106 via separate trunks 116 and 118, respectively. The D channel data is demodulated via modem 120. DNIC circuit 122 recombines the B and D channel data so as to provide connectivity to digital DNIC set 124.

Each DNIC peripheral 100 and 104 is constructed using Spine technology (see LHDE0027 System Design Specification ISS Tier 1—Set Handler, by George Jeffrey and Kevin Johnson), such that up to 23 DNIC lines and 23 trunks may be supported in conjunction with a switching matrix (i.e. matrix 103). The LS trunks 112 and 118 are reserved for the modems 114 and 120 contained within a peripheral controller (shown in greater detail with reference to FIG. 2).

According to the present invention, two configuration options are provided for implementing the DNIC peripheral extension described generally above. According to a first option, trunk calls are rerouted from the DNIC peripherals 104 and 100 through the PBX 102 in order to obtain Least Call Routing (LCR), SMDR and/or digital trunk access. According to the second option, the trunks are configured from the DNIC peripherals to place calls directly to the Central Office (i.e. PSTN 106). Configuration of either of the aforementioned options is performed by means of a configuration mode on the DNIC display set 124 or via a dedicated dataset (not shown) providing RS232 connectivity to a laptop (not shown). The method by which such configuration takes place is not germane to the invention.

Figure 2A:
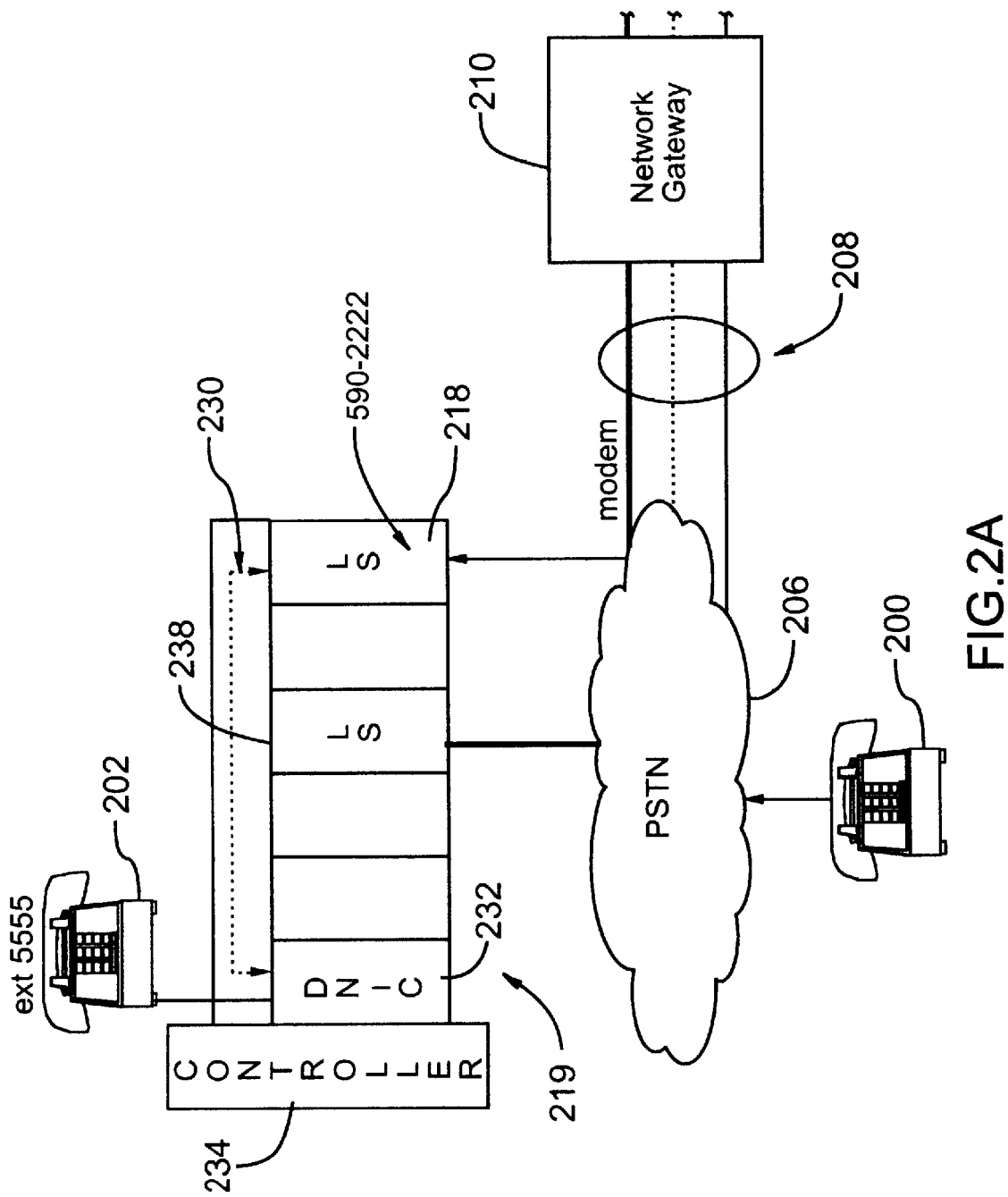
FIG. 2 is a block diagram showing a first configuration for routing a call through a local PBX to a remote digital set, according to the present invention.
Figure 2B:
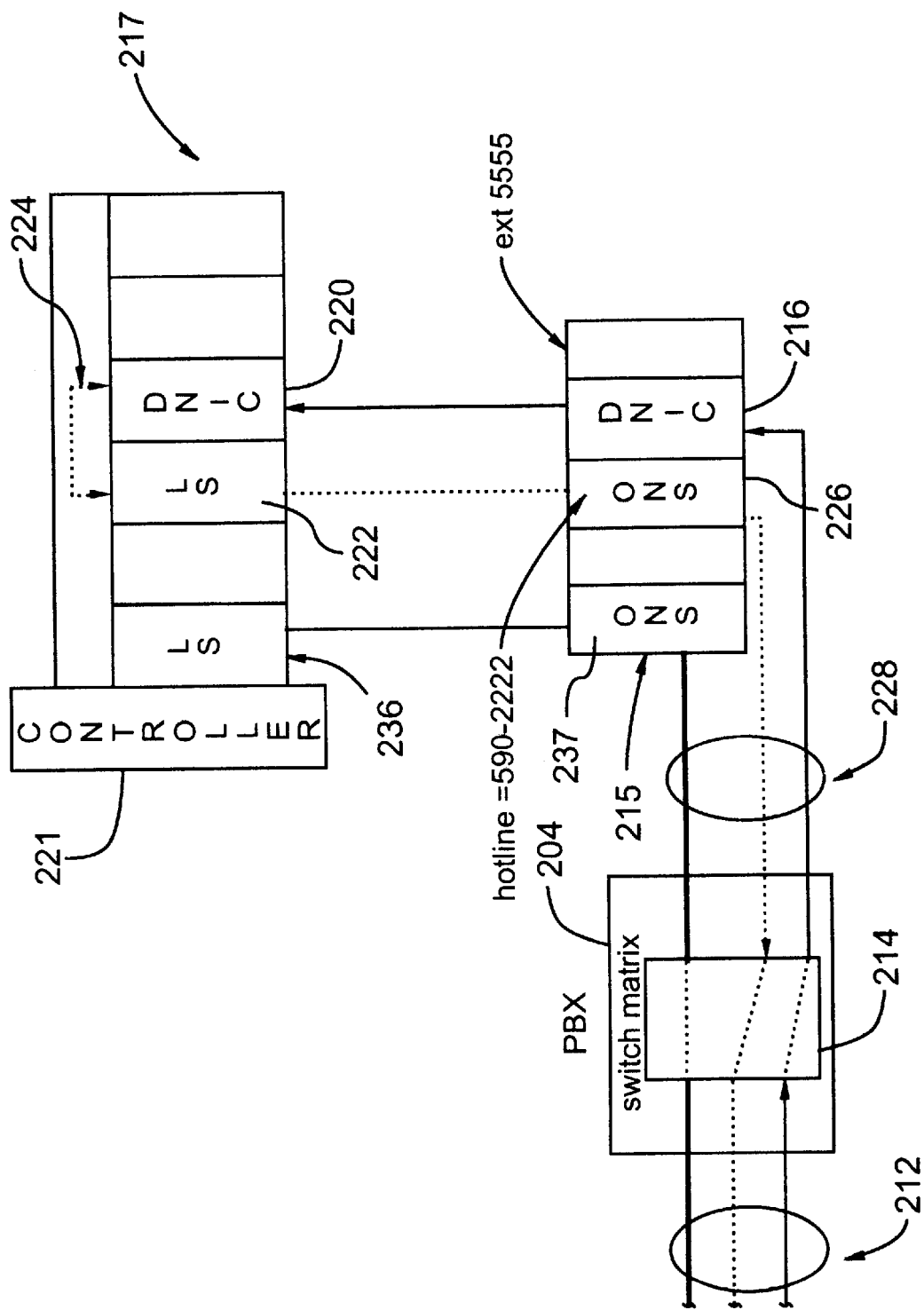

Turning now to FIG. 2, the first of the foregoing configuration options is illustrated. An example will now be provided of each of the two primary call origination scenarios, in order to better describe the invention.

In the event of a call originating from a subscriber 200 to a remote DNIC set 202 at, for example, a telephone number 592-5555, the call is routed through PSTN 206 in the usual manner for answering by PBX 204. In the illustrated embodiment, which is not intended to limit the scope of the invention, the call is switched digitally through the PSTN 206 and carried over a digital trunk 208 for reception by a network gateway 210 and thence transmitted to the PBX 204 over a fiber channel 212 (e.g. FIM). The PBX 204 switches the call via an internal switch matrix 214 to a predetermined DNIC circuit 216, within a peripheral shelf 215 associated with the called extension (e.g. ext 5555 in the example shown).

Upon detecting the incoming DNIC call, the local DNIC peripheral 217 places an outgoing call to a trunk 218 within remote DNIC peripheral 219, which is associated with the remote DNIC set 202 (i.e. the digits 592-5555 are dialed for ringing trunk 218). The local DNIC peripheral 217 connects a local DNIC voice circuit 220 to its associated trunk 222 via a circuit switch connection 224 (e.g. though the use of the aforementioned Spine architecture), under control of a peripheral controller 221. The PBX 204 receives the digits dialed by the DNIC peripheral trunk 222 through an ONS port 226 across fiber link 228, in a well known manner. The PBX then invokes an Automatic Route Selection (ARS) algorithm to obtain the least cost routing of the call to the remote DNIC peripheral trunk 218.

When the incoming call is detected by the remote DNIC peripheral 219, the trunk 218 answers the call and is connected to the associated set 202 in response to the subscriber at ext. 5555 going off-hook, via a circuit switch connection 230, between the trunk 218 and associated DNIC circuit 232, all under control of a peripheral controller 234.

Any Minet® display/control messages are transported via a dedicated modem connection between the local and remote peripherals 217 and 219 by means of the additional trunks 236 (via ONS circuit 237) and 238, and directed to the associated DNIC circuit 232 for set 202. Minet information transported over the modem must be addressed in order to correlate the data with the appropriate DNIC set. Addressing of the data is accomplished by providing two one-byte fields which contain the card slot and card circuit information from the transmitting card and circuit. The data format is as follows:

| Card Slot | Circuit | Minet Message |
| --- | --- | --- |

In the event of a call originating from remote DNIC set 202, the remote DNIC peripheral 219 initially provides dialtone to the set (in response to the set going off-hook), by means of an internal DSP circuit (not shown). Once the subscriber at set 202 begins dialing, the digits are forwarded via the aforementioned modem connection to the local peripheral 217 which has the appearance to the set 202 of being another DNIC set. The local peripheral 217 then forwards the dialed digits to the PBX 204 which in response places an outgoing call through the PSTN 206.

The local DNIC peripheral 217 establishes a voice path by initiating a LS trunk call to the PBX 204 in order to connect the LS trunk 218. This can be accomplished in one of two ways. Firstly, the PBX 204 can set up a "hotline" via ONS circuit 226 to the remote trunk 218 such that the local peripheral 217 is merely required to cause its trunk 222 to go off-hook, in response to which the ONS circuit dials the desired number (e.g. 592-5555 for ringing the set 200). Alternatively, the local DNIC peripheral 217 can be preconfigured such that each trunk knows the number of the remote trunk it has to dial.

The remote DNIC peripheral 219 answers the incoming trunk call from local peripheral 217 (via the PBX 204) and provides a voice path to the associated DNIC set 202 via a circuit switch connection between local trunk 222 and the DNIC circuit 216 associated with the DNIC set 202 via circuit 220.

Once the voice path has been established through the DNIC peripherals 217 and 219, all call progression tones are fed to the remote DNIC set 202 originating the call as well as to the established voice path.

Figure 3:
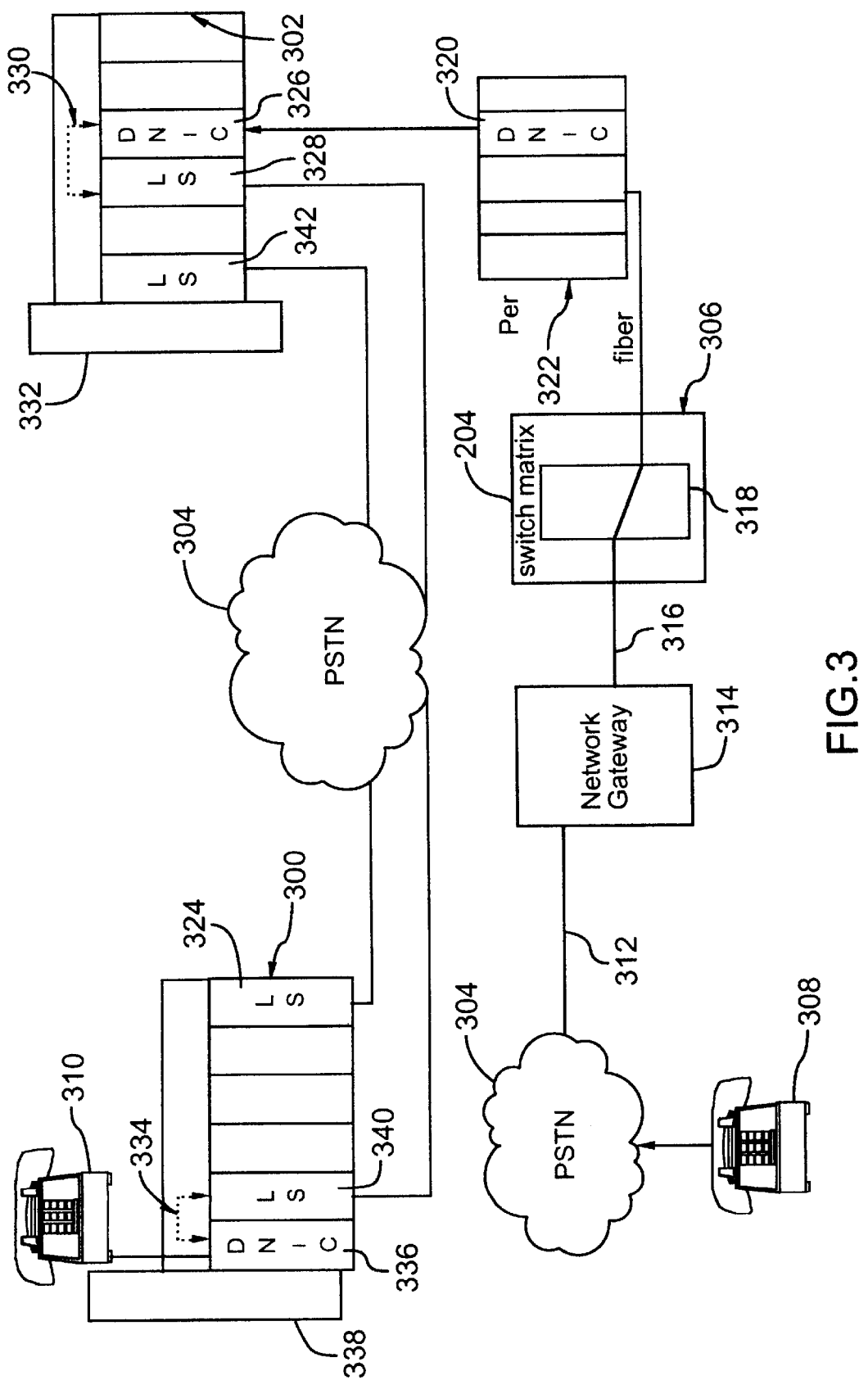
FIG. 3 is a block diagram showing a second configuration for direct access of the PSTN (Public Switched Telephone System) by a remote digital set, according to the invention.

According to the second configuration option, as illustrated in FIG. 3, DNIC peripherals 300 and 302 access the PSTN 304 directly via trunk calls, rather than via the PBX 306. This option reduces the number of resources required by the PBX 306 as compared to the first option illustrated in FIG. 2, and in particular eliminates the requirement for ONS lines. However, no SMDR records are recorded for trunk access, which is a feature of the first disclosed option. Further, there is no provision for digital trunk access.

The functional operations of the configuration of FIG. 3 remain essentially the same as for the configuration of FIG. 2.

In response to a telephone set 308 originating a call to a remote DNIC set 310, the call is first answered by PBX 306. The call is digitally switched through the PSTN 304 and carried over a digital trunk 312 for reception by a network getaway 314 and thence transmitted to the PBX 306 over a fiber channel 316 (e.g. FIM). The PBX 306 switches the call via an internal switch matrix 318 to a predetermined DNIC circuit 320 within peripheral shelf 322 associated with the called extension.

Upon detecting the incoming DNIC call, the local DNIC peripheral 302 places an outgoing call to the trunk 324 (within remote DNIC peripheral 300) which is associated with the remote DNIC set 310, and connects a local DNIC voice circuit 326 to its associated trunk 328 via a circuit switch connection 330, under control of a peripheral controller 332.

When the incoming call is detected by the remote DNIC peripheral 300, the trunk 324 answers the call and is connected to the associated set 310 in response to the remote subscriber at set 310 going off-hook, via a circuit switch connection 334, between the trunk 324 and associated DNIC circuit 336, all under control of a peripheral controller 338.

Any Minet® display/control messages are transported via a dedicated modem connection between the local and remote peripherals 302 and 300 by means of the additional trunks 340 and 342, and directed to the associated DNIC circuit 336 for set 310.

In the event of remote DNIC set 310 originating a call, the remote DNIC peripheral 300 initially provides dialtone to the set (once it has gone off-hook), by means of an internal DSP circuit (not shown). Once the subscriber at set 310 begins dialing, the digits are forwarded via the aforementioned modem connection to the local peripheral 302 which has the appearance to the set 310 of being another DNIC set. The local peripheral 302 then forwards the dialed digits to the PBX 306 which in response places an outgoing call through the PSTN 304.

The local DNIC peripheral 302 establishes a voice path by initiating a LS trunk call to the LS trunk 324. The remote DNIC peripheral 300 answers the incoming trunk call from local peripheral 302 and provides a voice path to the associated DNIC set 310.

Once the voice path has been established through the DNIC peripherals 300 and 302, all call progression tones are fed to the remote DNIC set 310 originating the call as well as to the established voice path.

It will be appreciated that, although a particular embodiment of the invention has been described and illustrated in detail, various changes and modifications may be made. All such changes and modifications may be made without departing from the sphere and scope of the invention as defined by the claims appended hereto.

What is claimed is:

1. A system for extending functionality of a remote digital telephone set over a public switched telephone network from a local PBX, comprising:

a local peripheral connected to said PBX for (i) bidirectionally communicating combined digital voice and data signals with said PBX, for (ii) separating voice and data components of said signals into respective bidirectional voice channels and signaling channels for bidirectional communication over the public switched telephone network and for (iii) recombining said voice and data components for said bidirectionally communicating said combined digital voice and data signals with said PBX; and a remote peripheral connected to said telephone set for (i) bidirectional communication with said local peripheral over the public switched telephone network via said respective voice channels and signaling channels, for (ii) recombining said voice and data components for bidirectional communication with said telephone set, and for (iii) separating said voice and data components for said bidirectional communication with said local peripheral over the public switched telephone network via said respective voice channels and signaling channels, whereby said remote digital telephone set functions as if it were connected directly to said PBX.

2. The system of claim 1, wherein each of said local peripheral and said remote peripheral further comprise:

at least one digital network interface circuit for separating and recombining said voice and data components;

at least one trunk circuit for bidirectionally communicating said voice components over said public switched telephone network via said voice channels across; and at least one further trunk circuit for bidirectionally communicating said data components over said public switched telephone network via said signaling channels.

3. The system of claim 2, wherein each of said local peripheral and said remote peripheral further comprises a modem for modulating and demodulating said data component for communication via said signaling channels.

4. A method of placing a telephone call from an originating party to said remote digital telephone set using the system of claim 2, comprising the steps of:

routing said call through said public switched telephone network to said PBX;

switching said call within said PBX to a predetermined interface circuit associated with said remote telephone set;

causing said local peripheral to place an outgoing call via said PBX over said public switched telephone network from said at least one trunk circuit within said local peripheral to said at least one trunk circuit within said remote peripheral which is associated with said set;

connecting said at least one digital network interface card within said local peripheral to said predetermined interface circuit and said at least one trunk circuit within said local peripheral for establishing a voice communication path therebetween;

detecting said outgoing call at said at least one trunk circuit within said remote peripheral and causing said set to ring;

in response to said set going off-hook, connecting said at least one digital network interface card within said remote peripheral to said at least one trunk circuit within said remote peripheral for establishing a voice communication path therebetween; and connecting said at least one digital network interface card within said remote peripheral to said at least one further trunk circuit within said remote peripheral for establishing a data communication path therebetween.

5. A method of placing a telephone call from an originating party to said remote digital telephone set using the system of claim 3, comprising the steps of:

routing said call through said public switched telephone network to said PBX;

switching said call within said PBX to a predetermined interface circuit associated with said remote telephone set;

causing said local peripheral to place an outgoing call via said PBX over said public switched telephone network from said at least one trunk circuit within said local peripheral to said at least one trunk circuit within said remote peripheral which is associated with said set;

connecting said at least one digital network interface card within said local peripheral to said predetermined interface circuit and said at least one trunk circuit within said local peripheral for establishing a voice communication path therebetween;

detecting said outgoing call at said at least one trunk circuit within said remote peripheral and causing said set to ring;

in response to said set going off-hook, connecting said at least one digital network interface card within said remote peripheral to said at least one trunk circuit within said remote peripheral for establishing a voice communication path therebetween; and connecting said at least one digital network interface card within said remote peripheral to said at least one further trunk circuit within said remote peripheral for establishing a data communication path therebetween.

* * * * *